United States Patent
Johri et al.

(10) Patent No.: US 10,807,588 B2
(45) Date of Patent: Oct. 20, 2020

(54) POWERTRAIN CONTROL SYSTEM AND STRATEGY FOR ELECTRIFIED VEHICLE

(71) Applicant: Ford Global Technologies, LLC, Dearborn, MI (US)

(72) Inventors: Rajit Johri, Canton, MI (US); Fazal Urrahman Syed, Canton, MI (US); Minku Lee, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 234 days.

(21) Appl. No.: 15/996,699

(22) Filed: Jun. 4, 2018

(65) Prior Publication Data
US 2019/0367007 A1 Dec. 5, 2019

(51) Int. Cl.
*B60W 20/13* (2016.01)
*B60W 10/06* (2006.01)
*B60W 10/08* (2006.01)

(52) U.S. Cl.
CPC ............ *B60W 20/13* (2016.01); *B60W 10/06* (2013.01); *B60W 10/08* (2013.01); *B60W 2540/10* (2013.01); *B60W 2540/12* (2013.01); *Y10S 903/93* (2013.01)

(58) Field of Classification Search
CPC ...... B60W 20/13; B60W 10/06; B60W 10/08; B60W 2540/10; B60W 2540/12; Y10S 903/93
USPC .......................................................... 701/22
See application file for complete search history.

(56) References Cited

U.S. PATENT DOCUMENTS

| | | | |
|---|---|---|---|
| 6,994,360 B2 | 2/2006 | Kuang et al. | |
| 8,140,204 B2 | 3/2012 | Okubo et al. | |
| 8,989,935 B2 | 3/2015 | Martin et al. | |
| 9,067,587 B1 | 6/2015 | Johri et al. | |
| 2009/0287366 A1* | 11/2009 | Davis | B60K 6/48 701/22 |
| 2011/0031050 A1* | 2/2011 | Bradley | G08G 1/096741 180/65.22 |

(Continued)

FOREIGN PATENT DOCUMENTS

JP 2012086771 * 5/2012 ......... Y02T 10/6221

OTHER PUBLICATIONS

English translation of JP2012086771, retrieved from Espacenet Mar. 17, 2020 (Year: 2012).*

*Primary Examiner* — Krishnan Ramesh
(74) *Attorney, Agent, or Firm* — David Kelley; Brooks Kushman PC (57) ABSTRACT

A vehicle including an engine, an electric machine, a traction battery, and a controller is provided. The controller is programmed to, during acceleration or constant speed travel of the vehicle and responsive to state of charge of the battery falling below a first threshold, run the engine to charge the battery. The controller is further programmed to, during the running and responsive to first occurrence of the state of charge achieving a second threshold, accelerator pedal release, or braking of the vehicle, stop the engine. The controller may be further programmed to, during accelerator pedal release or braking of the vehicle and responsive to the state of charge falling below the first threshold, inhibit start of the engine. The controller may be further programmed to, during the inhibiting and responsive to acceleration or constant speed travel of the vehicle, run the engine to charge the battery.

10 Claims, 4 Drawing Sheets

(56) References Cited

U.S. PATENT DOCUMENTS

| | | | | |
|---|---|---|---|---|
| 2013/0296125 | A1* | 11/2013 | Gibson | B60W 20/40 |
| | | | | 477/5 |
| 2016/0297415 | A1* | 10/2016 | Kato | B60W 10/184 |
| 2016/0297443 | A1* | 10/2016 | Kato | B60W 30/18018 |
| 2018/0056974 | A1* | 3/2018 | Meyer | B60W 10/023 |
| 2018/0297580 | A1* | 10/2018 | Kohno | B60W 30/16 |

* cited by examiner

POWERTRAIN CONTROL SYSTEM AND STRATEGY FOR ELECTRIFIED VEHICLE

TECHNICAL FIELD

This disclosure relates to a control strategy for a powertrain assembly of an electrified vehicle.

BACKGROUND

Electrified vehicles may include powertrains with a mode selection process feature to handle various powertrain modes and commands including engine pull-up/down requests. The requests may be issued based on various vehicle conditions. For example, when a high voltage battery state of charge (SOC) is below a certain threshold, an engine pull-up request may be issued to charge the high voltage battery to a specified SOC. However, the engine pull-up request is independent of driver demanded torque.

SUMMARY

A vehicle includes an engine, an electric machine, a traction battery, and a controller. The controller is programmed to, during acceleration or constant speed travel of the vehicle and responsive to state of charge of the battery falling below a first threshold, run the engine to charge the battery. The controller is further programmed to, during the running and responsive to first occurrence of the state of charge achieving a second threshold, accelerator pedal release, or braking of the vehicle, stop the engine. The controller may be further programmed to, during accelerator pedal release or braking of the vehicle and responsive to the state of charge falling below the first threshold, inhibit start of the engine. The controller may be further programmed to, during the inhibiting and responsive to acceleration or constant speed travel of the vehicle, run the engine to charge the battery. The controller may include an engine pull up/down (EPUD) logic. The controller may be further programmed to modify the EPUD logic to request engine shutdown responsive to detection of a driver demanded torque being more negative than a charge maintenance torque requested by an energy management feature. The energy management feature may be a software feature to control a power/torque split between the engine and the electric machine. The engine, electric machine, and traction battery may comprise a driveline and the driveline may be a series system, a power-split system, or a parallel system. The controller may be further programmed to output an inhibit engine pull-up request based on detection of a state of charge of the traction battery being below a predetermined threshold.

A vehicle includes an engine, electric machine, a traction battery, and a controller. The controller is programmed to, responsive to a state of charge (SOC) of the traction battery falling below a first threshold during steady or increasing accelerator pedal position with the engine off, start the engine. The controller is further programmed to, responsive to vehicle braking with the SOC below a second threshold greater than the first, stop the engine. The controller may be further programmed to, responsive to detection of the SOC for the battery being substantially equal to an engine pull-up threshold, output an inhibit engine pull-up command to prevent distribution of an engine pull-up command for a predefined time-period. The controller may be further programmed to output an engine pull-down command responsive to detection of a driver demanded torque being more negative than a charge maintenance torque threshold. The charge maintenance torque threshold may be based on driver demand, the SOC of the traction battery, an engine operating condition, or electric machine maximum/minimum torque limits. Deactivation of the engine as a result of the engine pull-down command may allow for additional energy recuperation of vehicle kinetic energy without burning fuel. The engine, electric machine, and the traction battery may comprise a powertrain and the powertrain may be a series system, a power-split system, or a parallel system.

A method for controlling a hybrid vehicle powertrain includes, responsive to detection of a driver-demanded torque being more negative than a charge maintenance torque requested by an energy management feature, outputting by a controller a modified engine pull-up/pull-down signal to request engine shutdown. The engine shutdown request may be further based on detection of the engine operating in an on state. The method may further include outputting an inhibit engine activation command by the controller responsive to detection of the engine operating in an off state. The charge maintenance torque requested may be based on driver demand, an engine operating condition, an electric machine maximum/minimum torque limits, or a state of charge of a high voltage battery in communication with the electric machine. The hybrid vehicle may include a series driveline, a power-split driveline, or a parallel driveline. The method may further include, responsive to detection of a state of charge for a high voltage battery being substantially equal to an engine pull-up threshold, outputting by the controller an engine pull-up suppression command.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
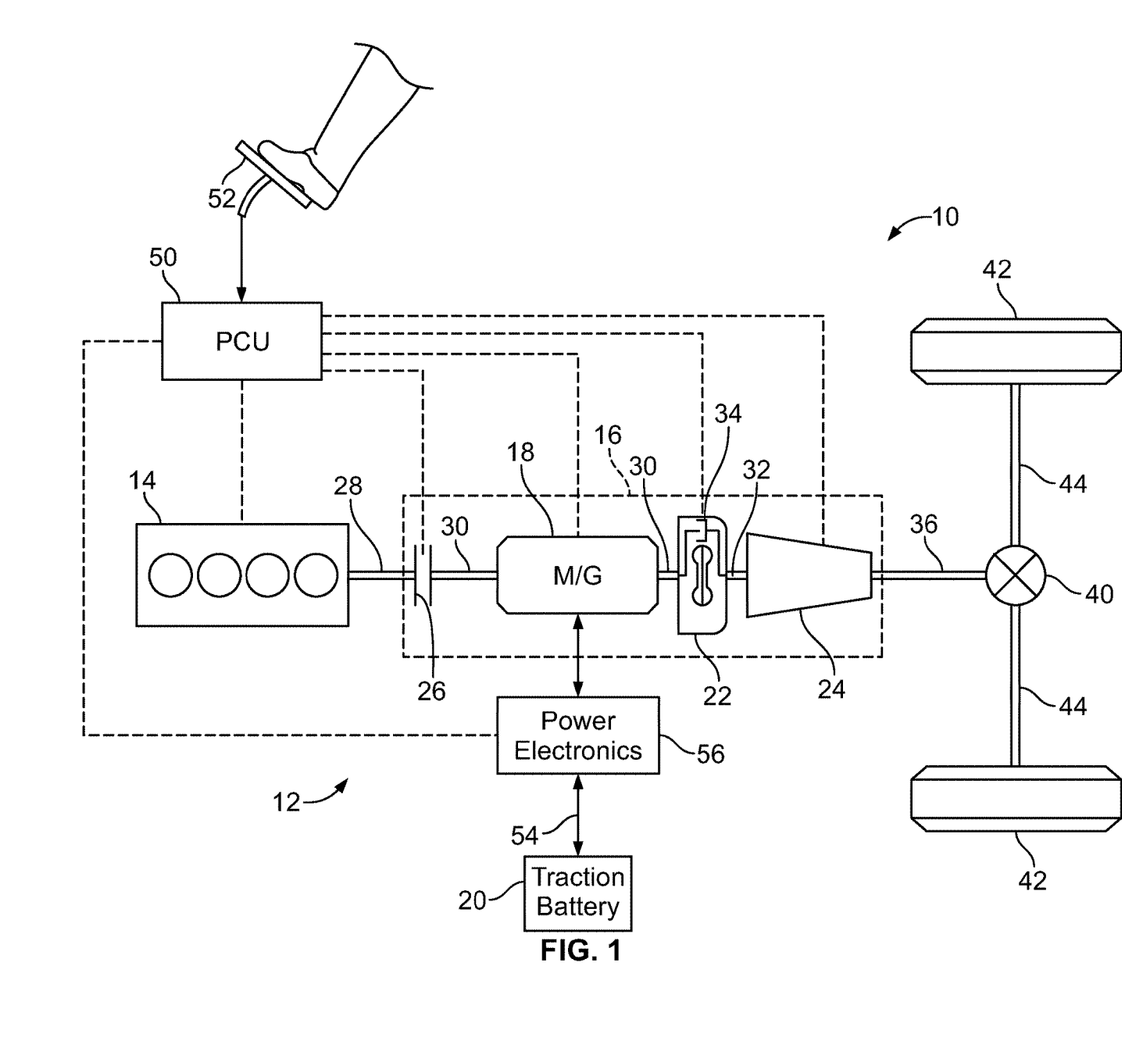
FIG. 1 is a schematic diagram illustrating an example of a vehicle.

FIG. 1 is a schematic diagram illustrating an example of a hybrid electric vehicle (HEV) referred to as a vehicle 10. The vehicle 10 includes a powertrain 12. The powertrain 12 includes an engine 14 that drives a transmission 16. The transmission 16 may include an electric machine such as an electric motor/generator (M/G) 18, an associated high voltage battery 20, a torque converter 22, and a multiple step-ratio automatic transmission, or gearbox 24.

The engine 14 generally represents a power source that may include an internal combustion engine such as a gasoline, diesel, or natural gas-powered engine, or a fuel cell. The engine 14 generates an engine power and corresponding engine torque that is supplied to the M/G 18 when a disconnect clutch 26 between the engine 14 and the M/G 18 is at least partially engaged.

At least partial engagement of the disconnect clutch 26 facilitates power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the high voltage battery 20. The high voltage battery 20 may also be referred to as a traction battery herein. The disconnect clutch 26 can also be disengaged to isolate the engine 14 from the remainder of the powertrain 12 such that the M/G 18 may act as the sole drive source for the vehicle 10. Shaft 30 extends through the M/G 18. The M/G 18 may be operably connected to the shaft 30, whereas the engine 14 may be operably connected to the shaft 30 only when the disconnect clutch 26 is at least partially engaged.

The M/G 18 may be connected to a torque converter 22 via shaft 30. The torque converter 22 is connected to the engine 14 when the disconnect clutch 26 is at least partially engaged. The torque converter 22 may include an impeller fixed to shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. During operation, oil may be introduced to assist in managing thermal conditions of the M/G 18.

A torque converter bypass clutch 34 may frictionally or mechanically couple the impeller and the turbine of the torque converter 22. The torque converter bypass clutch 34 may be operated as a launch clutch to provide a smooth vehicle launch.

The gearbox 24 may include gear sets (not shown) that are selectively placed in different gear ratios by selective engagement of friction elements such as clutches and brakes to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 may be automatically shifted from one ratio to another based on various vehicle and ambient operating conditions by an associated controller. The gearbox 24 may then provide powertrain output torque to output shaft 36.

The output shaft 36 may be connected to a differential 40. The differential 40 drives a pair of wheels 42 via respective axles 44 connected to the differential 40. The differential 40 transmits approximately equal torque to each wheel 42 while selectively permitting slight speed differences under certain conditions such as when the vehicle turns a corner.

The powertrain 12 further includes an associated controller 50 such as a powertrain control unit (PCU). The controller 50 may be part of a larger control system and may be controlled by various other controllers throughout the vehicle 10, such as a vehicle system controller (VSC). The controller 50 and one or more other controllers may collectively be referred to as a "controller" that controls various actuators in response to signals from various sensors to control functions such as starting/stopping the engine 14, operating M/G 18 to provide wheel torque or charge the high voltage battery 20, select or schedule transmission shifts, etc. The controller 50 may include a microprocessor or central processing unit (CPU) in communication with various types of computer readable storage devices or media.

The controller 50 may communicate with various sensors and actuators via an input/output (I/O) interface that may be implemented as a single integrated interface that provides various raw data or signal conditioning, processing, and/or conversion, short-circuit protection, and the like. The controller 50 may communicate signals to and/or from the engine 14, the disconnect clutch 26, the M/G 18, the launch clutch 34, the transmission gearbox 24, and the power electronics 56. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, transmission gearbox 24, and the like.

The control logic may be implemented in software executed by a microprocessor-based vehicle, engine, and/or powertrain controller, such as the controller 50. When implemented in software, the control logic may be provided in one or more computer-readable storage devices or media having stored data representing code or instructions for execution by a computer to control the vehicle or its subsystems.

An accelerator pedal 52 is used by a vehicle driver to provide a demanded torque, power, or drive command to propel the vehicle. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34.

To drive the vehicle 10 with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. The high voltage battery 20 transmits stored electrical energy through wiring 54 to power electronics 56 that may include an inverter, for example. The power electronics 56 convert DC voltage from the high voltage battery 20 into AC voltage to be used by the M/G 18.

The controller 50 commands the power electronics 56 to convert voltage from the high voltage battery 20 to an AC voltage provided to the M/G 18 to provide positive or negative torque to the shaft 30. This operation mode may be referred to as an "electric-only mode," "electric vehicle mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the high voltage battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the high voltage battery 20.

Figure 2:
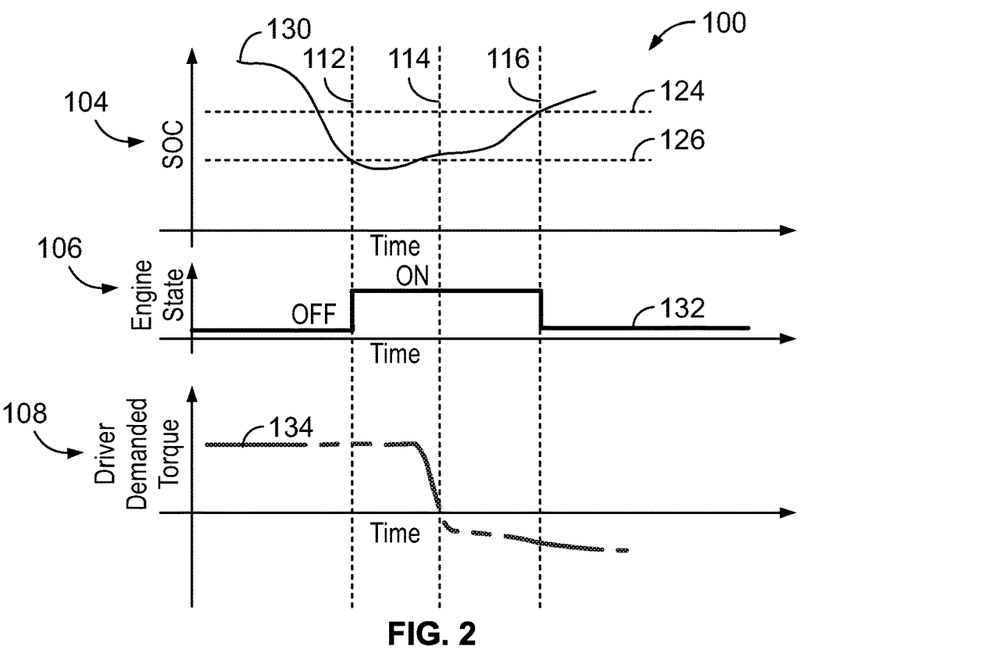
FIG. 2 is a graph illustrating a portion of an example of an engine pull-up/down (EPUD) control strategy.

FIG. 2 is a graph illustrating a portion of an example of an electrified vehicle engine pull-up/down (EPUD) control strategy, referred to generally as a graph 100 herein. The graph 100 includes three sections arranged with one another to illustrate how different portions of a vehicle operate with one another based on the EPUD control strategy. A first section 104 relates to a state of charge (SOC) of a high voltage battery. A second section 106 relates to an engine state condition. A third section 108 relates to driver demanded torque. X-axes of each of the sections represent time. Line 112 represents a first time, line 114 represents a second time, and line 116 represents a third time. An engine pull range is defined between a pull-down threshold represented by a line 124 and a pull-up threshold represented by a line 126.

In this example, plot 130 represents a high voltage battery SOC over a time-period, plot 132 represents an engine state condition over the time-period, and plot 134 represents a driver demanded torque over the time-period. A mode selection process (MSP) unit or controller within a VSC may direct powertrain operation including EPUD requests. The EPUD requests may be based on, for example, an accelerator tip-in/out, a total driver power demand, and a high voltage battery SOC. In the event the high voltage battery SOC is below a predetermined threshold, the controller may issue an engine pull-up request to activate the engine to assist in recharging the high voltage battery to a predetermined SOC. For example, plot 130 at line 112 shows that a battery SOC is at the pull-up threshold represented by line 126. As such, an engine pull-up request may be initiated to activate the engine as shown by plot 132 at line 112. Once the high voltage battery SOC reaches the upper end of the engine pull threshold, the engine may be pulled down, such as a scenario shown at an intersection of line 116, line 124, and plot 130.

During a lift of the accelerator pedal or a braking application, driver demanded torque may be negative. An engine may be pulled down and a motor may provide negative torque to meet the driver demand while also assisting in charging the high voltage battery. In an event in which the engine is already pulled up for high voltage battery SOC maintenance before the driver lifts off the accelerator pedal or executes the braking application, the engine may continue to run as the driver demanded torque transitions to negative as shown at the line 114 of FIG. 2. The engine will continue to burn fuel to produce charging torque and the motor will provide negative torque to meet both the driver demanded torque as well as absorbing the charging torque from the engine. The engine will eventually shut down when the high voltage battery SOC reaches the pull-down threshold at line 124. The EPUD logic for SOC maintenance operates independently of driver demanded torque which may result in a reduction in motor torque available to utilize for vehicle energy regeneration.

Figure 3:
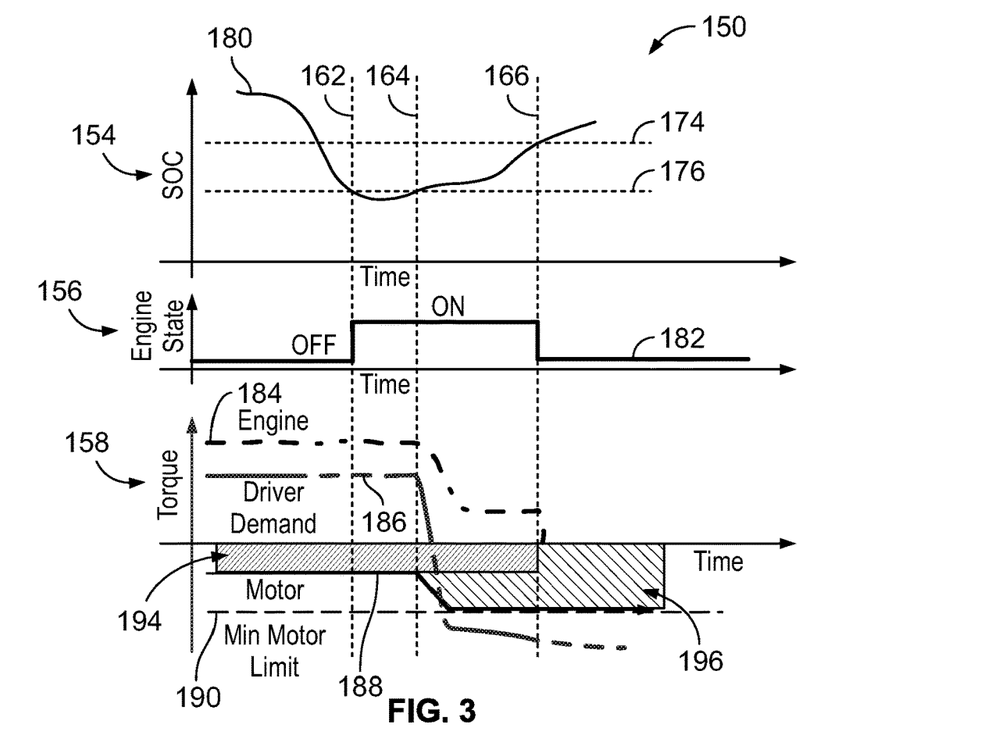
FIG. 3 is a graph illustrating a portion of another example of an EPUD control strategy.

FIG. 3 is a graph illustrating a portion of an example of another EPUD control strategy for an electrified vehicle, referred to generally as a graph 150 herein. The graph 150 includes three sections arranged with one another to illustrate how different portions of a vehicle operate with one another based on the EPUD control strategy. A first section 154 relates to a SOC of a high voltage battery. A second section 156 relates to an engine state condition. A third section 158 relates to torque. X-axes of each of the sections represents time. Line 162 represents a first time, line 164 represents a second time, and line 166 represents a third time. An engine pull range is defined between a pull-down threshold represented by line 174 and a pull-up threshold represented by line 176.

In this example, plot 180 represents a high voltage battery SOC over a time-period and plot 182 represents an engine state condition over the time-period. Plot 184 represents engine operation torque over the time-period, plot 186 represents driver-demanded torque over the time-period, and plot 188 represents motor operation torque over the time-period. Line 190 represents a predefined minimum motor torque limit. The predefined minimum motor torque limit may also be a torque level represented by a curved line instead of a straight line as shown in FIG. 3. The predefined minimum motor torque limit may be, for example, based on hardware limits. Region 194 represents an amount of motor torque used for charging the high voltage battery by burning fuel. Region 196 represents an amount of motor torque used for regeneration to recapture vehicle kinetic energy. In one example, the region 196 may represent an amount of energy obtained from regenerative braking.

In a scenario in which driver demanded torque is below the predefined minimum motor torque limit represented by line 190, a portion of motor torque is needed to support absorption of engine torque and only a portion of the motor torque is used to recapture vehicle kinetic energy. As shown in FIG. 3, the region 194 and the region 196 partially overlap one another between line 164 and line 166. If the engine would have been shut down at the time represented by line 164, more regeneration energy could have been captured to assist in improving vehicle fuel economy instead of burning fuel to generate motor torque for charging purposes. As another example scenario, during acceleration or constant speed travel of the vehicle and response to the high voltage battery SOC falling below a first threshold, the engine may be directed to run to charge the high voltage battery. Further, during the running and responsive to first occurrence of the SOC achieving a second threshold, accelerator pedal release, or braking of the vehicle, the engine may be directed to stop. Alternatively, responsive to the SOC of the high voltage battery falling below the first threshold during steady or increasing accelerator pedal position with the engine off, the engine may be directed to start. Further, responsive to vehicle braking with the SOC below the second threshold greater than the first threshold, the engine may be directed to stop.

Vehicle fuel economy may be improved if the EPUD logic relating to SOC maintenance additionally considers driver demanded torque and is able to request engine pull-down even when the SOC has not yet reached the pull-down threshold represented by line 174.

Figure 4:
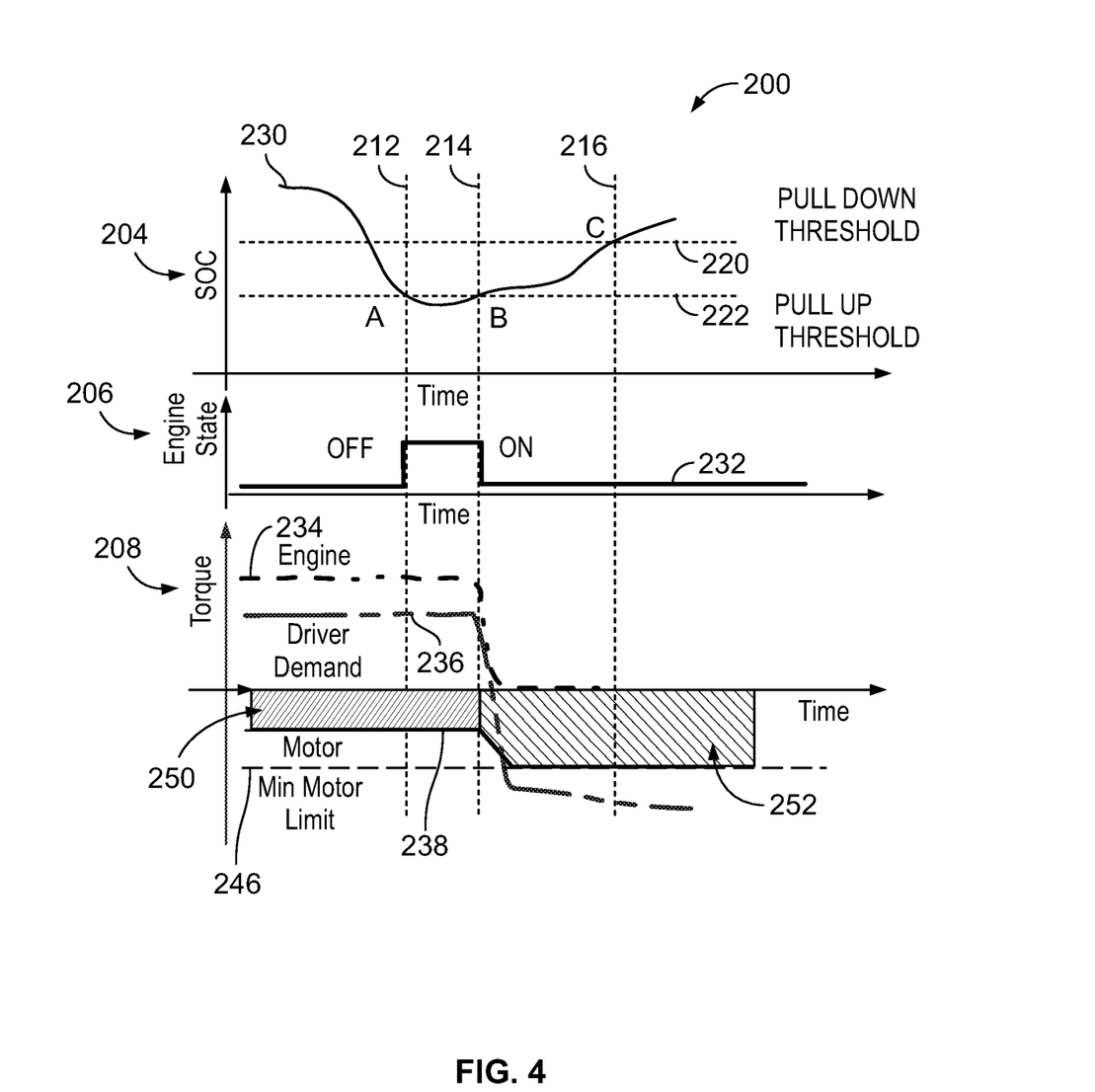
FIG. 4 is a graph illustrating a portion of another example of an EPUD control strategy.

FIG. 4 is a graph illustrating a portion of an example of another EPUD control strategy for an electrified vehicle, referred to generally as a graph 200 herein. The graph 200 includes three sections arranged with one another to illustrate how different portions of a vehicle operate with one another based on the EPUD control strategy. A first section 204 relates to a SOC of a high voltage battery. A second section 206 relates to an engine state condition. A third section 208 relates to torque. X-axes of each of the sections represents time. Line 212 represents a first time, line 214 represents a second time, and line 216 represents a third time. An engine pull range is defined between a pull-down threshold represented by line 220 and a pull-up threshold represented by line 222.

In this example, plot 230 represents a high voltage battery SOC over a time-period and plot 232 represents an engine state condition over the time-period. Plot 234 represents engine operation torque over the time-period, plot 236 represents driver-demanded torque over the time-period, and plot 238 represents motor operation torque over the time period. Line 240 represents a predefined minimum motor torque limit. Region 250 represents an amount of motor torque used for charging the high voltage battery by burning fuel. Region 252 represents an amount of motor torque used for regeneration to recapture vehicle kinetic energy.

In this example, the engine is in an off condition at the second time represented by line 214. For example, a controller in communication with components relating to the EPUD control strategy may direct the engine to power off so that motor torque is used for regeneration (e.g. the region 252) to charge a high voltage battery instead of burning fuel (e.g. the region 250) to charge the high voltage battery. In this scenario, the control strategy may operate to maximize a capture of energy from a source other than fuel of the engine.

Figure 5:
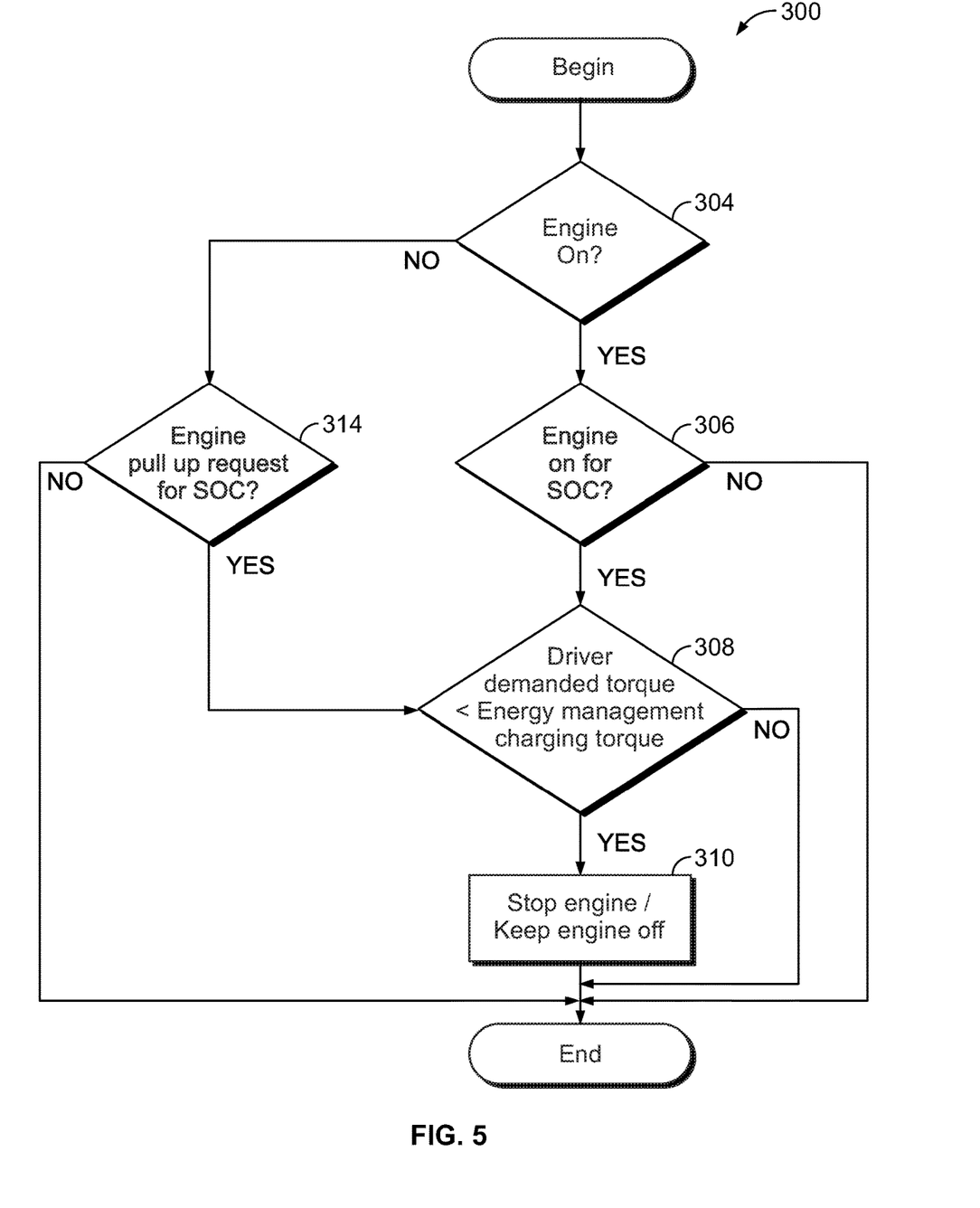
FIG. 5 is a flow chart illustrating an example of a portion of a control strategy for a hybrid vehicle.

FIG. 5 is a flow chart illustrating an example of a portion of a control strategy for a hybrid vehicle, referred to generally as a control strategy 300 herein. In operation 304, a controller may identify an engine state. In the event the controller identifies the engine is on, the controller may identify whether the engine is in a SOC maintenance mode in operation 306. A SOC maintenance mode is a mode in which the engine is operating based on a SOC of a high voltage battery.

In the event the controller identifies that the engine is in a SOC maintenance mode in operation 306, the controller may identify whether a driver demanded torque is less than an energy management charging torque threshold in operation 308. Driver demanded torque may be based on driver inputs related to an accelerator pedal and a brake pedal.

The energy management charging torque threshold may be considered a dynamic signal representing an optimal split between engine and high voltage battery power to maximize efficiency. In one example, the energy management charging torque threshold may be based on driver demand, a high voltage battery SOC, an engine operating condition, or motor maximum/minimum torque limits.

In the event the controller identifies that the driver demanded torque is less than the energy management charging torque in operation 308, in operation 310 the controller may output a command to stop the engine, to pull-down the engine, to keep the engine off, or to inhibit future engine pull-ups for a predetermined time-period or for a time-period based on vehicle conditions.

In the event the controller identifies that the engine is off in operation 304, the controller may identify whether an engine pull-up request has been issued to maintain the SOC of the high voltage battery in operation 314. In the event an engine pull-up request has been issued, the controller may proceed to operation 308 and operate as described above.

In the event the controller identifies an engine pull-up request has not been issued in operation 314, the controller may proceed to end the control strategy. In the event the controller identifies the engine is not on for SOC maintenance in operation 306, the controller may proceed to end the control strategy. In the event the controller identifies that the driver demanded torque is greater than the energy management charging torque in operation 308, the controller may proceed to end the control strategy. In an example in which driver demanded torque is detected as being more negative than a charge maintenance torque requested by an energy management feature, the controller may be programmed to modify the EPUD logic to request engine shutdown. The energy management feature may be a software feature to control a power/torque split between the engine and the electric machine.

Additionally, the control strategy 300 may be used with other types of hybrid vehicle systems including a capability to switch off an engine independent of a vehicle state while accommodating driver propulsion demands with a separate propulsion source. A power-split system or a parallel hybrid system with a post transmission motor are two additional examples of hybrid vehicle systems which may use the control strategy 300.

A power-split system may operate in a parallel system or a series system via a planetary gear box. The parallel system may include a mechanical coupling between an engine and set of wheels. The series system may include communication between the engine and high voltage battery for energy transfer and the high voltage battery may then transfer power to a set of wheels.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle comprising:
an engine, an electric machine, and a traction battery; and
a controller programmed to,
during acceleration or constant speed travel of the vehicle and responsive to state of charge of the battery falling below a first threshold, run the engine to charge the battery, during the running and responsive to first occurrence of the state of charge achieving a second threshold, accelerator pedal release, or braking of the vehicle, stop the engine, during accelerator pedal release or braking of the vehicle and responsive to the state of charge falling below the first threshold, inhibit start of the engine, and request engine shutdown responsive to detection of a driver demanded torque being more negative than a charge maintenance torque requested by an energy management feature, the driver demanded torque being determined by accelerator pedal release, or braking of the vehicle.

2. The vehicle of claim 1, wherein the controller is further programmed to, during the inhibiting and responsive to acceleration or constant speed travel of the vehicle, run the engine to charge the battery.

3. The vehicle of claim 1, wherein the energy management feature is a software feature to control a power/torque split between the engine and the electric machine.

4. The vehicle of claim 1, wherein the engine, electric machine, and traction battery comprise a driveline, and wherein the driveline is a series system, a power-split system, or a parallel system.

5. The vehicle of claim 1, wherein the controller is further programmed to output an inhibit engine pull-up request based on detection of the state of charge of the traction battery being below a predetermined threshold.

6. A vehicle comprising:
an engine, an electric machine, and a traction battery; and
a controller programmed to,
during acceleration or constant speed travel of the vehicle and responsive to state of charge of the battery falling below a first threshold, run the engine to charge the battery, during the running and responsive to first occurrence of the state of charge achieving a second threshold, accelerator pedal release, or braking of the vehicle, stop the engine, request engine shutdown responsive to detection of a driver demanded torque being more negative than a charge maintenance torque requested by an energy management feature, the driver demanded torque being determined by accelerator pedal release, or braking of the vehicle, and output an inhibit engine pull-up request based on detection of the state of charge of the traction battery being below a predetermined threshold.

7. The vehicle of claim 6, wherein the controller is further programmed to, during accelerator pedal release or braking of the vehicle and responsive to the state of charge falling below the first threshold, inhibit start of the engine.

8. The vehicle of claim 7, wherein the controller is further programmed to, during the inhibiting and responsive to acceleration or constant speed travel of the vehicle, run the engine to charge the battery.

9. The vehicle of claim 6, wherein the energy management feature is a software feature to control a power/torque split between the engine and the electric machine.

10. The vehicle of claim 6, wherein the engine, electric machine, and traction battery comprise a driveline, and wherein the driveline is a series system, a power-split system, or a parallel system.

* * * * *